(12) United States Patent
Nowak et al.

(10) Patent No.: US 6,344,628 B1
(45) Date of Patent: Feb. 5, 2002

(54) CV BACKGROUND FOR WELDING

(75) Inventors: Albert Nowak, Appleton; Bruce P. Albrecht, Hortonville; Richard M. Hutchison, New London, all of WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/404,235

(22) Filed: Sep. 23, 1999

(51) Int. Cl.[7] .................................................. B23K 9/10
(52) U.S. Cl. ............................... 219/137 PS; 219/130.1
(58) Field of Search ..................... 219/130.1, 130.21, 219/130.31, 130.32, 130.33, 130.4, 130.51, 137 PS

(56) References Cited

U.S. PATENT DOCUMENTS

| | | | |
|---|---|---|---|
| 2,763,811 A | * 9/1956 | Williams | 219/130.4 |
| 2,777,973 A | * 1/1957 | Steele et al. | 219/130.4 |
| 3,444,430 A | * 5/1969 | Needham | 219/130.4 |
| 3,530,359 A | 9/1970 | Grist | |
| 3,665,149 A | * 5/1972 | Sakabe et al. | 219/130.51 |
| 3,792,225 A | 2/1974 | Needham et al. | |
| 3,818,177 A | 6/1974 | Needham et al. | |
| 4,071,885 A | * 1/1978 | Bilczo et al. | 219/130.33 |
| 4,409,465 A | 10/1983 | Yamamoto et al. | |
| 4,517,439 A | 5/1985 | Colley | |
| 4,686,350 A | 8/1987 | Bodewig | |
| 4,897,522 A | 1/1990 | Bilczo et al. | |
| 4,897,773 A | 1/1990 | Bilczo | |
| 5,218,182 A | 6/1993 | Vogel et al. | |

FOREIGN PATENT DOCUMENTS

| | | | |
|---|---|---|---|
| DE | 2628385 | * 12/1977 | 219/130.1 |
| SU | 1268334 | * 11/1986 | 219/130.1 |

OTHER PUBLICATIONS

Miller ® The Power of Blue. Millermatic® 250X And M–25 Gun Jun. 1999.

* cited by examiner

Primary Examiner—Clifford C. Shaw
(74) Attorney, Agent, or Firm—George R. Corrigan

(57) ABSTRACT

First and second CV power sources are connected in parallel. The first CV source provides an output sufficient for welding. The second CV source also has an output sufficient for welding, but at is at a voltage less than the voltage of the output of the first CV source and may also have a lower current output. Voltage from the first CV source is blocked from being applied to the second CV source, preferably by diodes or SCRs. The second CV source is a background source with a secondary and a rectifier, preferably a center tapped secondary with a full wave rectifier, and an inductor between the output. The first CV source is a welding source with a secondary and a rectifier, preferably a center tapped secondary with a full wave rectifier, and an inductor between the rectifier and the output.

47 Claims, 4 Drawing Sheets

US 6,344,628 B1

CV BACKGROUND FOR WELDING

FIELD OF THE INVENTION

The present invention relates generally to the art of welding power supplies. More specifically, it relates to welding power supplies having a CV background.

BACKGROUND OF THE INVENTION

Many known welding power supplies provide either a constant current (CC) or a constant voltage (CV) output. Generally, regulated welding power supplies operating in a CC mode monitor the output current, and control the power supply in response to the detected current and a user selected current setpoint. Likewise, regulated welding power supplies operating in a CV mode monitor the output voltage, and control the power supply in response to the detected voltage and a user selected voltage setpoint, to provide a generally constant average output voltage. Many power supplies are multi-purpose, and can be operated in either CV or CC mode. This invention relates particularly to welding power supplies having a CV mode.

Some power supplies that operate in a CV mode are phase controlled power supplies, such as the power supply used in the MM 250X®. The MM 250X® power supply allows the user to select an output voltage when in the CV mode. Power at the selected voltage is provided to a wire feeder, which feeds wire to an arc. The user selects a wire feed speed, which determines the current provided to the arc, or selects a welding current, which determines the wire feed speed.

A schematic of the MM 250® power circuitry is shown in FIG. 1. Generally, power circuit 100 includes a transformer core 102, having center tapped secondaries 104 and 106. Center tapped secondary, as used herein, includes a single secondary with a center tap, or two secondaries sharing a common core with a common node. A pair of SCR's 108 and 110 form a phase controlled rectifier. The rectifier is disposed between the secondaries and the output of power source 100. The output of the SCR's is provided through an inductor 112 (405 µH) on an output line to a positive output stud 117. (Output line, as used herein, is the line connecting to the output studs, output connection, etc, through which power is provided to the arc.) The center tap of the secondary is connected to a negative output stud 118. Thus, the output of power circuit 100 is applied across the output studs. Capacitors 115 and 116 filter noise. A capacitor 114 (120,000 µF capacitor bank) is provided, with inductor 112, to maintain the voltage and current across the output studs when the SCR's are off.

When an alternating voltage is provided to the primary (not shown) of transformer 102 a voltage is induced across secondaries 104 and 106. The voltage is rectified by SCR's 108 and 110. Phase control of the SCR's regulates the portion of the rectified wave that is provided to the output, thus regulating the output voltage. When one of the SCR's is conducting, the current passes through the secondary, through inductor 112, through the welding arc and back to the secondary. When both SCR's are off, the current path is from inductor 112, through the welding arc, and back through capacitor 114. Capacitor 114 and inductor 112 thus help to smooth the output and average the voltage provided by power source 100, so that a generally constant voltage output is provided to the output lines (i.e., applied across the output studs).

Power supply 100 is regulated by monitoring the voltage across capacitor 114. The monitored voltage is compared to a user selected voltage, and if the magnitude of the monitored voltage is not great enough, then SCR's 108 and 110 are turned on for greater portions of each cycle. Conversely, if the magnitude of the monitored voltage is too great, then SCR's 108 and 110 are turned on for a lesser portion of the cycle.

The design of FIG. 1 is relatively inexpensive, reliable, and easily controlled. However, under some circumstance it is difficult to start the welding arc with such a design. Specifically, when the welding arc is initiated, the output voltage is not provided until the next time an SCR is turned on. Also, the inductance of inductor 112, which preferably is large so that it effectively stabilizes the current output, delays the start of welding current.

Additionally, at lower voltage outputs the portion of each cycle that the SCR is on is so small that there can be discontinuities and/or undesirable ripple (when the voltage dips so low the arc is unstable) in the output voltage and/or current. Such an output has an adverse impact on the weld quality.

One prior art design that attempts to provide adequate welding starts includes a high frequency starter circuit across the welding output. Another design includes a boost circuit in parallel with the welding output. Examples of the latter include U.S. Pat. No. 3,530,359 issued to Grist, and U.S. Pat. No. 4,897,522 issued to Bilczo. The boost power supply has a higher voltage and lower current than the welding power supply. Such power supplies may be more expensive and may not be suitable for maintaining the arc at lower output voltages.

Accordingly, a CV power source that is relatively inexpensive, reliable, and easily controlled, but that also provides easy starts and high quality welding at lower output voltages is desirable.

SUMMARY OF THE PRESENT INVENTION

According to a first aspect of the invention a CV welding power supply includes first and second power sources, connected in parallel across a first and a second output line. The first CV source provides an output sufficient for welding. The second CV source also has an output sufficient for welding, but at a voltage less than the voltage of the output of the first CV source.

According to a second aspect of the invention a CV welding power supply includes a background CV source, having a lower voltage output and a lower current output to first and second output lines. A welding CV source, having a higher voltage output and a higher current output sufficient for welding, is also connected across the first and second output lines.

Voltage from the first CV source is blocked from being applied to the second CV source in one embodiment.

The second CV source is a background source with a background secondary and a background rectifier in another embodiment. The background secondary may be a center tapped secondary and the background rectifier may be a full wave rectifier having two background rectifying elements. The two background rectifying elements may be SCRs or diodes, which also block the first voltage.

A background inductor is disposed between the background secondary and at least one of the first and second output lines and/or a background capacitor disposed such that current can flow from one of the first and second output lines, to the background capacitor, to the background inductor, and to the other of the first and second output lines in various alternatives.

The first CV source is a welding source with a welding secondary and a welding rectifier in another embodiment. The welding secondary may be a center tapped secondary and the welding rectifier may be a full wave rectifier having two welding rectifying elements. The two welding rectifying elements may be SCRs or diodes.

The background secondary and the welding secondary are wound about a first core and the background secondary may also be wound about a second core in another alternative.

A welding inductor is disposed between the welding secondary and at least one of the first and second output lines and/or a welding capacitor disposed such that current can flow from one of the first and second output lines, to the welding capacitor, to the welding inductor, and to the other of the first and second output lines in various alternatives.

The welding inductor and the background inductor share a common inductor core in another alternative.

According to a third aspect of the invention a method of providing CV welding power includes providing power to a pair of output lines at a first CV voltage and a first current sufficient for welding. Power is also provided to the pair of output lines at a second CV voltage, and at a second current sufficient for welding. The second voltage is less than the first CV voltage.

According to a fourth aspect of the invention a method of providing CV welding power includes providing power to a pair of output lines at a first lower CV voltage, and at a first lower current, and providing power to the pair of output lines at a second higher CV voltage, and at a second higher current sufficient for welding.

Voltage from the first CV source is blocked from being applied to the second CV source in one embodiment.

The output of a background secondary is rectified and/or the output of the background secondary is phase controlled in various alternatives.

The output of a welding secondary is rectified and/or the output of the welding secondary is phase controlled in various alternatives.

Other principal features and advantages of the invention will become apparent to those skilled in the art upon review of the following drawings, the detailed description and the appended claims.

Figure 1:
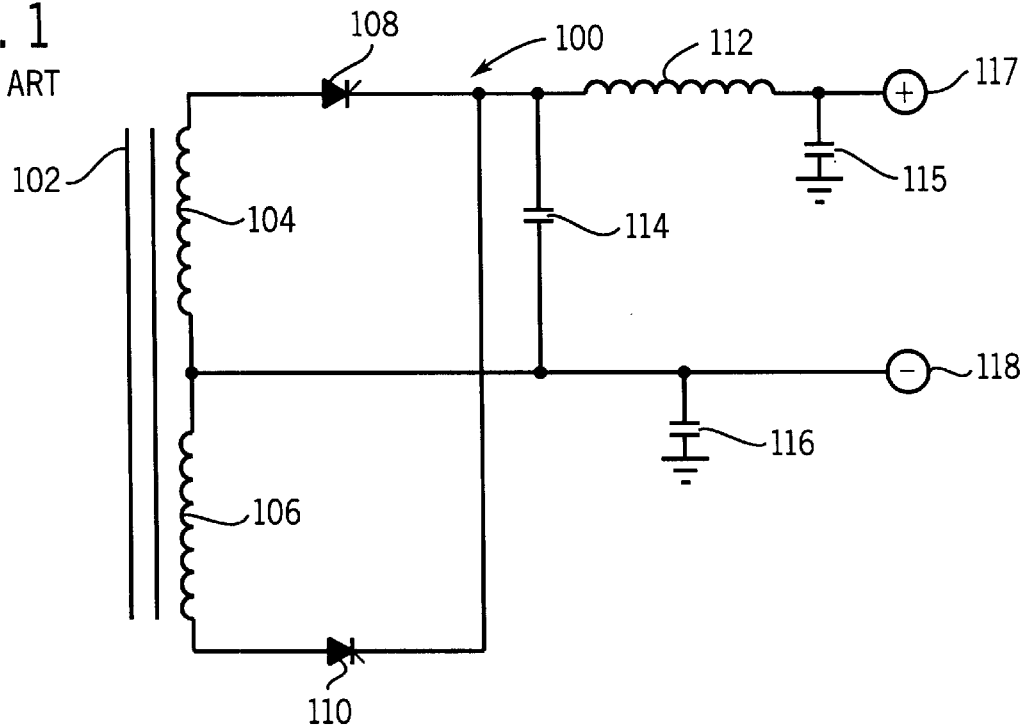
FIG. 1 is a schematic of a prior art power circuit.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular power circuit used for welding it should be understood at the outset that the invention can also be employed with other circuits, and for other purposes.

Figure 2:
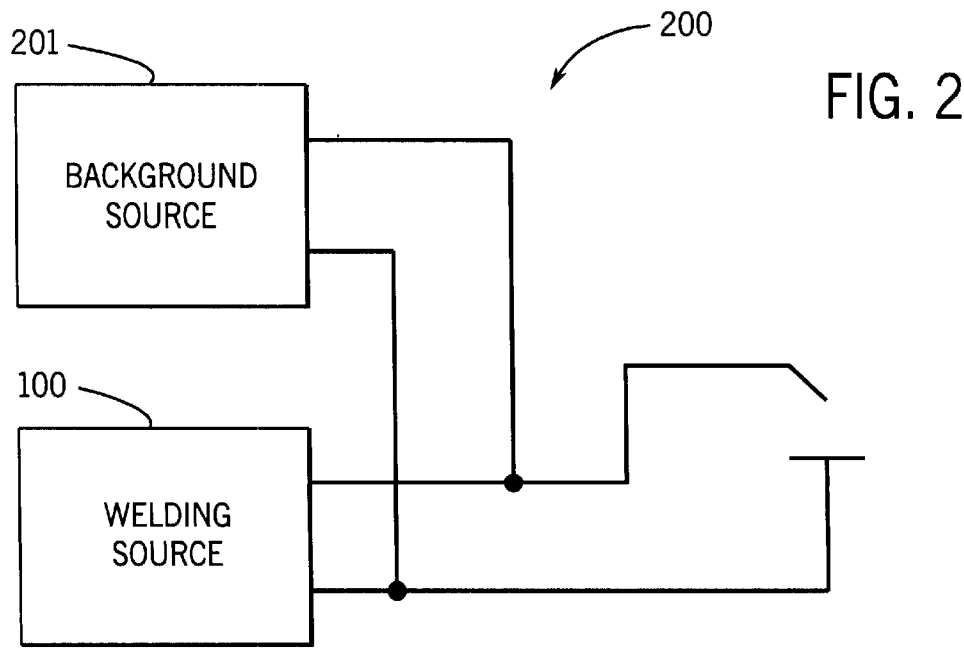
FIG. 2 is a block diagram of a power supply in accordance with the present invention.

Generally, in accordance with the present invention, as shown in FIG. 2, a welding power supply 200 includes two power sources for CV welding. The power sources are both connected across the output lines or studs. A welding power source 100 provides a higher voltage and a welding current for welding while a background power source 201 provides a lower voltage output and a welding current for starting and for maintaining the arc when the user selects a low CV output. Both power sources provide sufficient current for welding (i.e., each power source can, on its own, provide an output current and voltage at which meaningful welding can be performed over a period of time). However, the output current of background power source 201 is often lower than the output current of welding power source 100, particularly given the nature of the arc and the higher voltage of welding power source 100.

Both the welding and the background power sources are similar to the prior art power supply of FIG. 1 in the preferred embodiment. Preferably, welding power source 100 provides output voltage of greater than about 18 volts. The welding power source provides sufficient current to weld at this voltage. Background power source 201 provides, in the preferred embodiment, an unregulated 17 volt output. The 17 volts is useful for starting the welding arc, and for maintaining the weld when the user selects a low output voltage at which to weld.

Figure 3:
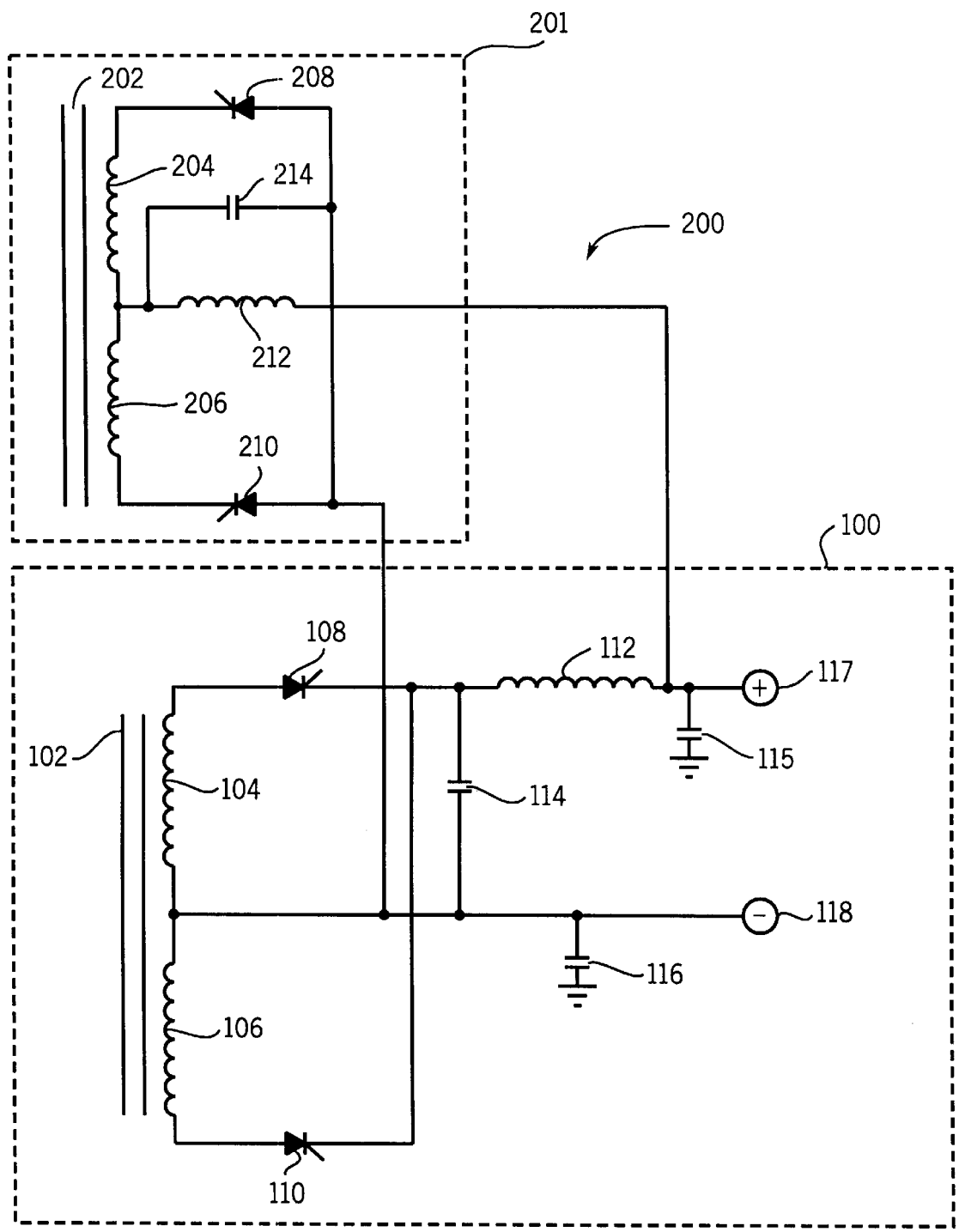
FIG. 3 is a schematic of a power circuit in accordance with the present invention.

Referring now to FIG. 3, it may be seen that welding power source 200 includes prior art welding power source 100 of FIG. 1 and background power source 201. Power circuit 100 includes center tapped secondaries 104 and 106, rectifiers 108 and 110, inductor 112, capacitor bank 114 and output lines or studs 117 and 118. These components function as does the prior art, wherein an output voltage is provided and regulated by phase controlling SCR's 108 and 110 in response to the actual output voltage and a desired voltage.

Welding power source 200 is controlled consistent with the prior art. In the preferred embodiment the controller of the prior art MM 250® controls power source 100, and power source 100 is implemented with the power circuit of the MM 250X®.

Background power source 201 includes transformer core 202 having center tapped background secondaries 204 and 206, a full wave rectifier including SCR's 208 and 210, a background inductor 212 (405 $\mu$H), and a capacitor 214 (91,000 $\mu$F). The output of background power source 201 is provided across output lines or studs 117 and 118. Thus, welding power source 100 and background power source 201 are in parallel across output lines or studs 117 and 118.

SCR's 208 and 210 are phase controlled to provide an unregulated output of 17 volts open circuit (16.5 volts at 80 amps when loaded) in the preferred embodiment. SCR's 208 and 210 are phased full-on with no attempt to regulate the output. The 17 volts is provided whenever the operator or user triggers the weld to be on, such as with a MIG welding gun trigger. In an alternative embodiment the control is the same as the control of the MM 250X®, but uses a fixed setpoint of 17 volts, rather than a user selected setpoint.

Because the welding and background power sources are connected in parallel across output lines or studs 117 and 118, the output voltage will be the greater output of the two power sources, and the lesser output will have little effect on the voltage. Both outputs may contribute to the total current. During operation, if the user selects a low CV output voltage that might otherwise cause discontinuities or undesirable ripple, background power source 201 provides a CV (17 volts open circuit) output that maintains and stabilizes the arc. At very low output voltages the entire welding current may be provided by background power source 201. At higher output voltages background power source 201 has little effect on the output, and the entire welding current may come from welding power source 100.

Figure 5A:
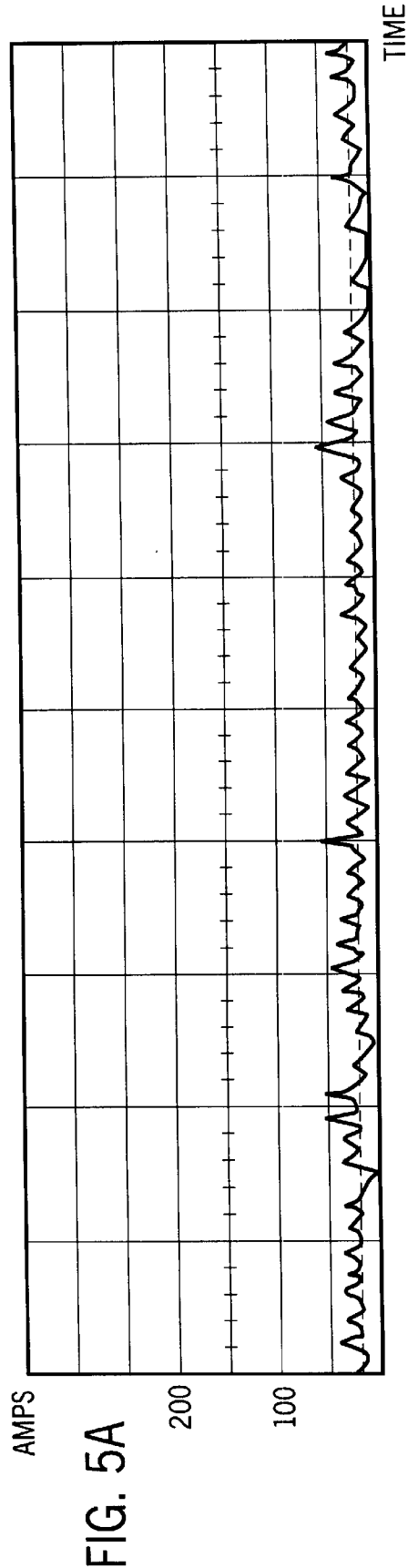
FIGS. 5A and 5B are waveforms of the current output of a background power source and the combined current output of background power source and a welding power source in accordance with the present invention.
Figure 5B:
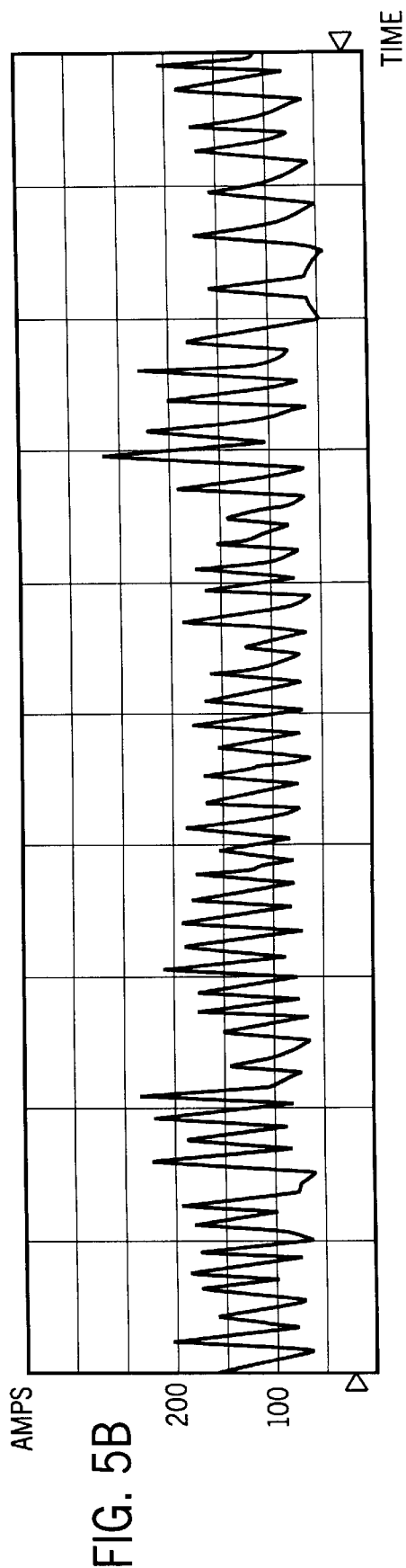

FIG. 5A is a graph showing the output current of background power source 201, and FIG. 5B is a graph showing the total output current of welding power source 200 (the current from background power source 201 combined with the current from welding power source 100. The user setpoints were about 16 volts and a wire feed speed corresponding to about 109 amps, using 0.035 ER70s-6 mild steel wire, C25 gas (75% Ar, 25% $CO_2$), welding a lap joint on 14 gauge steel. It may be seen that the total current is greater than background current, thus both the background and welding power sources contribute to the output current.

Additionally, when the welding arc is initiated background power source 201 has voltage immediately available for starting, thus helping to provide a quick and clean start. Also, background inductor 212 preferably has a lower inductance than welding inductor 112, because the majority of the current at high loads comes from welding power source 100, not background power source 201. Thus, the inductance of background inductor 212 does not delay the current as much as welding inductor 112 would.

SCR's 208 and 210 also serve as voltage blocks if the output voltage of welding power source 100 is greater than the output voltage of background power source 201, In other words, SCR's 201 and 210 block voltage from being applied to background power source 201. Likewise, SCR's 108 and 110 also serve as voltage blocks if the output voltage of background power source 201 is greater than the output voltage of welding power source 100. Other rectifying elements, such as diodes or switches are used in place of SCR's 108, 100, 208 and 210, in various embodiments. When diodes are used, the output of the power sources may be unregulated. For example, with the proper turns ratio for background secondaries 204 and 206 it may be possible to use diodes and still obtain a 17 volt output (alternatively SCR's 208 and 210 could be continuously gated on).

Another alternative provides for welding and/or background inductors 112 and 212 to be disposed in different legs of the rectifying circuits. For example, inductor 112 could be disposed in the center tap leg, and connected between the node common to welding secondaries 104 and 106 and output line or stud 118. Preferably, the inductors are disposed between the secondary and one of the output lines or studs, i.e., between one end of each secondary, and an output line or stud.

Figure 4:
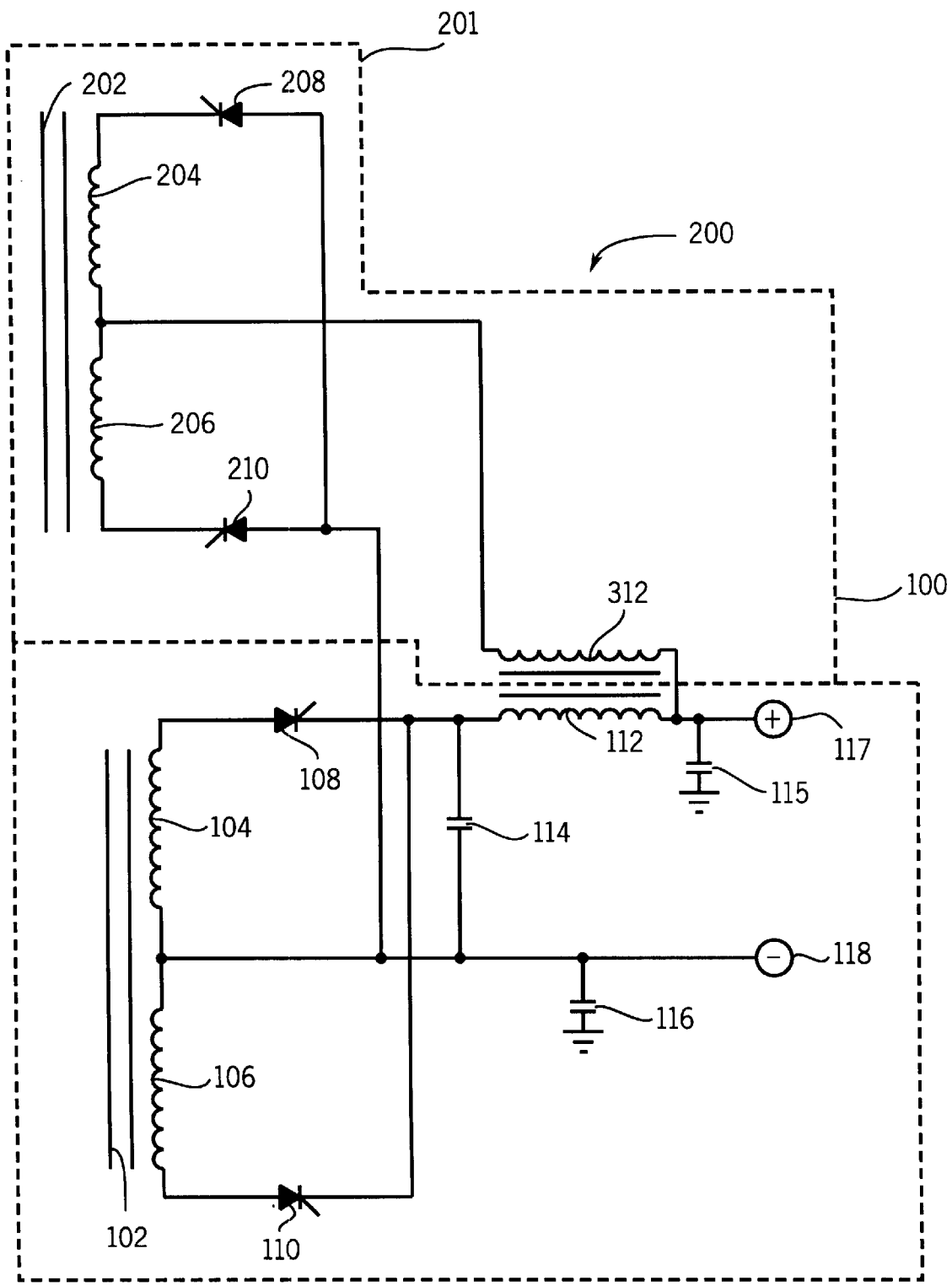
FIG. 4 is a schematic of a power circuit in accordance with the present invention.

Another alternative, shown in FIG. 4, provides for welding inductor 112 and background inductor 312 to be wound about a common core. The circuit functions as does the circuit of FIG. 3, but at the start of welding arc, background current through background inductor 312 saturates (at least partially) the core about which welding inductor 112 is wound. Thus, there is less of a delay for the welding current to be provided. Additionally, the embodiment of FIG. 3 requires less material, since only one inductor core (not two) must be provided.

In various alternatives background secondaries 204 and 206 to be wound about the same core that welding secondaries 204 and 206 are wound about (i.e. core 202 is the same core as core 102), or background secondaries 204 and 206 are wound about a different core than welding secondaries 204 and 206 are wound about (i.e. core 202 is not the same core as core 102).

Another alternative provides that background power source 200 is a low-voltage, lower (than welding power source 100) current power source. The lower current should be sufficient for starting and/or stabilizing the arc, but need not be sufficient for welding.

Numerous modifications may be made to the present invention which still fall within the intended scope hereof. For example, the invention could be employed with other power sources than the ones shown, including inverters, converters, choppers, etc. It could also be employed in a CV system having a cc pulse such as that used for welding aluminum.

A phase shift between the background and welding power sources maybe created by an appropriately sized inductor (in addition to or instead of the background inductor) between the background secondary and the output. A phase shift may advantageously allow the background power source to fill in the valleys from the welding power source.

Thus, it should be apparent that there has been provided in accordance with the present invention a method and apparatus for CV welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A CV welding power supply comprising;
   a first and a second output line;
   a first CV source, having a first voltage output, and having a first current output sufficient for welding, wherein the first CV output is connected across the first and second output lines; and
   a second CV source, having a second voltage output, and having a second current output sufficient for welding, wherein the second voltage is less than the first voltage and the second CV output is connected across the first and second output lines;
   wherein the first voltage is user selectable and the second voltage is sufficient for arc welding.

2. The apparatus of claim 1, further comprising a voltage block disposed to block voltage from the first CV source being applied to the second CV source.

3. The apparatus of claim 2, wherein the second CV source comprises a background secondary, and a background rectifier disposed between the background secondary and the first and second output lines.

4. The apparatus of claim 3, wherein the background secondary is a center tapped secondary, and the background rectifier is a full wave rectifier having two background rectifying elements.

5. The apparatus of claim 4, wherein the two background rectifying elements are SCRs, and the voltage block comprises the two SCR's.

6. The apparatus of claim 4, wherein the two background rectifying elements are diodes, and the voltage block comprises the two diodes.

7. The apparatus of claim 3, wherein the second CV source includes a background inductor disposed between the background secondary and at least one of the first and second output lines.

8. The apparatus of claim 7, wherein the second CV source includes a background capacitor disposed such that current can flow from one of the first and second output lines, to the background capacitor, to the background inductor, and to the other of the first and second output lines.

9. The apparatus of claim 3, wherein the first CV source comprises a welding secondary and a welding rectifier disposed between the welding secondary and the first and second output lines.

10. The apparatus of claim 9, wherein the background secondary and the welding secondary are wound about a first core.

11. The apparatus of claim 9, wherein the background secondary is wound a first core and the welding secondary is wound about a second core.

12. The apparatus of claim 9, wherein the welding secondary is a center tapped secondary, and the welding rectifier is a full wave rectifier having two welding rectifying elements.

13. The apparatus of claim 12, wherein the two welding rectifying elements are SCRs.

14. The apparatus of claim 12, wherein the two welding rectifying elements are diodes.

15. The apparatus of claim 9, wherein the first CV source includes a welding inductor disposed between the welding secondary and at least one of the first and second output lines.

16. The apparatus of claim 15, wherein the first CV source includes a welding capacitor disposed such that current can flow from one of the first and second output lines, to the welding capacitor, to the welding inductor, and to the other of the first and second output lines.

17. The apparatus of claim 7, wherein the first CV source comprises a welding secondary and a welding rectifier disposed between the welding secondary and the first and second output lines, and a welding inductor disposed between the welding secondary and at least one of the first and second output lines, wherein the welding inductor and the background inductor share a common inductor core.

18. A CV welding power supply comprising;
a first and a second output line;
a center tapped background secondary, disposed to provide a background voltage output, and to provide a background current output sufficient for welding, and disposed across the first and second output lines;
a full wave background rectifier, having two background rectifying elements, disposed between the background secondary and the first and second output lines;
a background inductor disposed between the background secondary and at least one of the first and second output lines;
a center tapped welding secondary, disposed to provide a welding voltage output, and to provide a welding current output sufficient for welding, and disposed across the first and second output lines;
a full wave welding rectifier, having two welding rectifying elements, disposed between the welding secondary and the first and second output lines; and
a welding inductor disposed between the welding secondary and at least one of the first and second output lines;
wherein the welding voltage is user selectable and the background voltage is sufficient for arc welding.

19. The apparatus of claim 18, wherein the two welding rectifying elements are SCRs.

20. The apparatus of claim 18, wherein the background secondary and the welding secondary are wound about a first core.

21. The apparatus of claim 18, wherein the two welding rectifying elements are diodes.

22. The apparatus of claim 18, wherein the background inductor and the welding inductor are wound about a common core.

23. A CV welding power supply comprising;
a first and a second output line;
a first CV source means for providing a first CV output having a first voltage output, and having a first current output sufficient for welding, wherein the first CV output is connected across the first and second output lines;
a second CV source means for providing a second CV output having a second voltage output, and having a second current output sufficient for welding, wherein the second voltage is less than the first voltage and the second CV output is connected across the first and second output lines;
wherein the first voltage is user selectable and the second voltage is sufficient for arc welding.

24. The apparatus of claim 23, further comprising voltage blocking means for blocking voltage from the first CV source means being applied to the second CV source means.

25. The apparatus of claim 24, wherein the second CV source comprises a background secondary, and a background rectifier means for rectifying disposed between the background secondary and the first and second output lines.

26. The apparatus of claim 25, wherein the second CV source means includes a background inductor means for providing an inductance, disposed between the background secondary and at least one of the first and second output lines.

27. The apparatus of claim 26, wherein the first CV source comprises a welding secondary, and a welding rectifier means for rectifying disposed between the welding secondary and the first and second output lines.

28. The apparatus of claim 26, wherein the first CV source comprises a welding secondary, and a welding rectifier means for rectifying disposed between the welding secondary and the first and second output lines, and a welding inductor means for providing an inductance, disposed between the welding secondary and at least one of the first and second output lines, wherein the welding inductor means and the background inductor means share a common inductor core.

29. A method of providing CV welding power comprising;
providing power to a pair of output lines at a first CV voltage, and at a first current sufficient for welding; and
providing power to the pair of output lines at a second CV voltage, and at a second current sufficient for welding, wherein the second CV voltage is less than the first CV voltage;
wherein the first CV voltage is user selectable and the second CV voltage is sufficient for arc welding.

30. The method of claim 29, further comprising blocking voltage from the first CV source from being applied to the second CV source.

31. The method of claim 30, wherein providing power to a pair of output lines at a second CV voltage comprises rectifying the output of a background secondary.

32. The method of claim 30, wherein providing power to a pair of output lines at a second CV voltage further comprises phase controlling the output of the background secondary.

33. The method of claim 31 wherein providing power to a pair of output lines at a first CV voltage comprises rectifying the output of a welding secondary.

34. The method of claim 33, wherein providing power to a pair of output lines at a first CV voltage further comprises phase controlling the output of the welding secondary.

35. A method of providing CV welding power comprising;

phase controlling the output of a welding secondary;

rectifying the output of the welding secondary to produce a first CV output at a first CV voltage, and at a first current sufficient for welding; and providing the first CV output to a pair of output lines;

phase controlling the output of a background secondary;

rectifying the output of the background secondary to produce a second CV output at a second CV voltage, and at a second current sufficient for welding, wherein the second CV voltage is less than the first CV voltage; and providing the second CV output to the pair of output lines; wherein the first CV voltage is user selectable and the second CV voltage is sufficient for arc welding.

36. The method of claim 35, further comprising blocking voltage from the first CV source from being applied to the second CV source.

37. A CV welding power supply comprising;

a first and a second output line;

a background CV source, having a lower voltage output, and lower current output, connected across the first and second output lines; and a welding CV source, having a higher voltage output and a higher current output sufficient for welding, connected across the first and second output lines;

wherein the higher voltage is user selectable and the lower voltage is sufficient for arc welding.

38. The apparatus of claim 37, further comprising a voltage block disposed to block voltage from the welding CV source being applied to the background CV source.

39. The apparatus of claim 37, wherein the background CV source comprises a background secondary, and a background rectifier disposed between the background secondary and the first and second output lines.

40. The apparatus of claim 39, wherein the background secondary is a center tapped secondary, and the background rectifier is a full wave rectifier having two background rectifying elements.

41. The apparatus of claim 39, wherein the background CV source includes a background inductor disposed between the background secondary and at least one of the first and second output lines.

42. The apparatus of claim 39, wherein the welding CV source comprises a welding secondary and a welding rectifier disposed between the welding secondary and the first and second output lines.

43. The apparatus of claim 42, wherein the welding secondary is a center tapped secondary, and the welding rectifier is a full wave rectifier having two welding rectifying elements.

44. The apparatus of claim 42, wherein the welding CV source includes a welding inductor disposed between the welding secondary and at least one of the first and second output lines.

45. The apparatus of claim 44, wherein the welding inductor and the background inductor share a common inductor core.

46. A CV welding power supply comprising;

a first and a second output line;

a background CV source means for providing a lower voltage output and a lower current output, wherein the background CV source is connected across the first and second output lines; and a welding CV source means for providing a higher voltage output and a higher current output, wherein the welding CV source is connected across the first and second output lines;

wherein the higher voltage is user selectable and the lower voltage is sufficient for arc welding.

47. A method of providing CV welding power comprising;

providing power to a pair of output lines at a first lower CV voltage, and at a first lower current; and providing power to the pair of output lines at a second higher CV voltage, and at a second higher current sufficient for welding;

wherein the higher CV voltage is user selectable and the lower CV output is sufficient for arc welding.

* * * * *